F. C. MILLER.
SEED-SEPARATOR.
No. 6,882. Reissued Jan. 25, 1876.
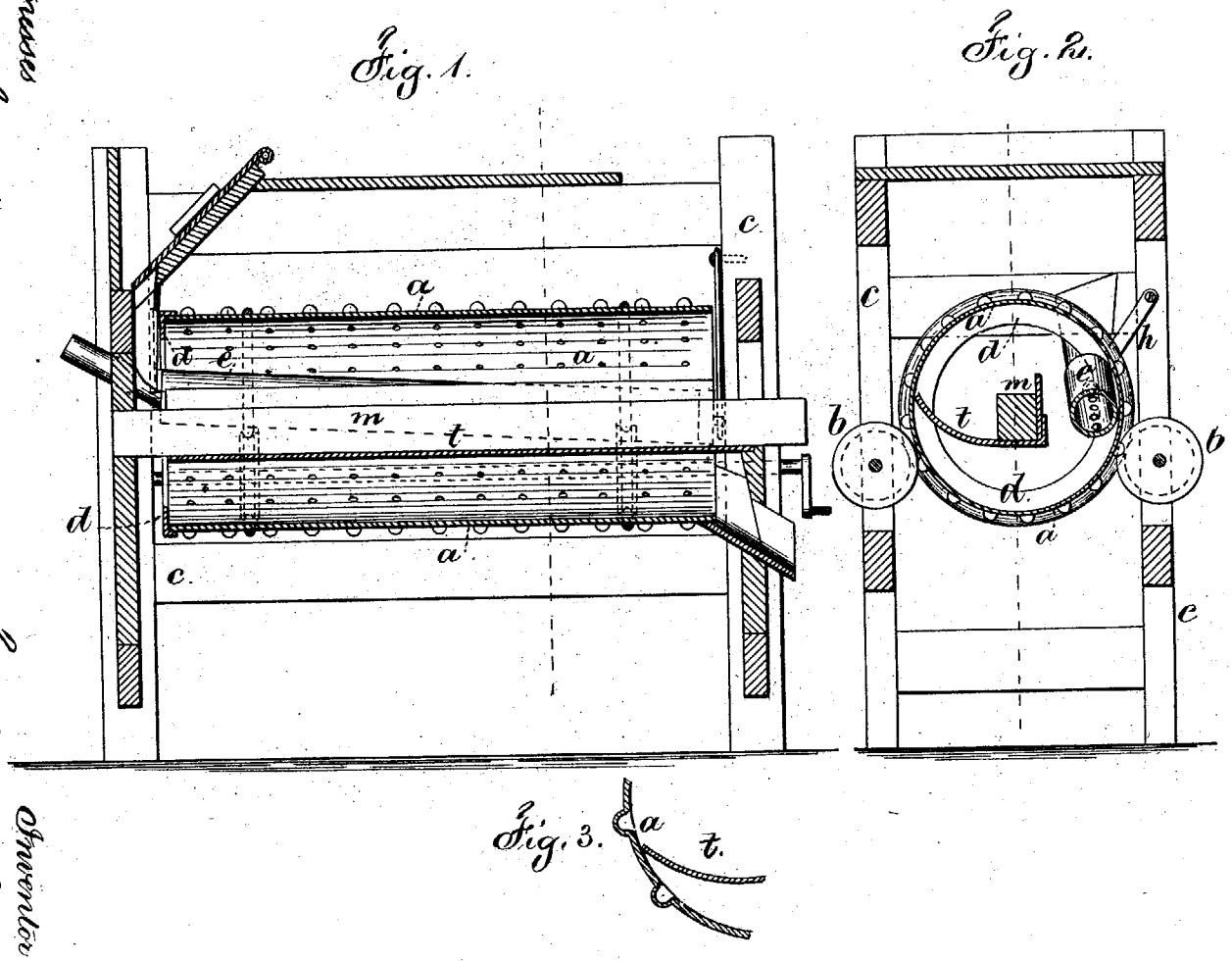
Witnesses
Chas. H. Smith
Harold Serrell
Inventor
Frank C. Miller
per Lemuel W. Serrell
atty.
N. PETERS, PHOTO-LITHOGRAPHER, WASHINGTON, D. C.

UNITED STATES PATENT OFFICE.

FRANK C. MILLER, OF BLUE EARTH CITY, MINNESOTA, ASSIGNOR OF ONE-HALF INTEREST TO REUBEN W. CHADBOURN, CHAS. H. CHADBOURN, AND GEORGE W. VAN DUSEN.

IMPROVEMENT IN SEED-SEPARATORS.

Specification forming part of Letters Patent No. 142,170, dated August 26, 1873; reissue No. 6,882, dated January 25, 1876; application filed October 25, 1875.

*To all whom it may concern:*

Be it known that I, FRANK C. MILLER, of Blue Earth City, in the county of Faribault and State of Minnesota, have invented an Improvement in Grain and Seed Separators, of which the following is a specification:

Before my invention cylinders for grain-separators had been made with cavities, sometimes on the outside and sometimes on the inside, which cavities were of a size adapted to receive the cockle and other small seeds or material in the grain, but too small to hold the grain itself; hence such cavities served to separate, elevate, and deliver the materials foreign to the grain in small quantities, but such cylinders were made of wood or other material thick enough to contain said recesses.

In consequence of this mode of making the recesses but comparatively few could be introduced in each square foot of surface on the cylinder. The cylinders were large and heavy, and the separating operation necessarily slow.

Cylinders for separators have also been made of two metal plates, one perforated and the other slightly recessed. This cylinder is heavy and expensive, and the cavities are liable to become obstructed by particles that adhere between the two plates.

The present invention relates to the mode of constructing such cylinders, whereby the cavities are easily and cheaply made, and placed so closely together that the separating apparatus is very rapid and efficient, and occupies but a small space; and said cavities or indentations are of such form that they will not clog with grain.

I employ sheet metal for the cylinder; preferably, zinc, iron, copper, or tin, and in the same the recesses or cavities are struck up by a punch and die, or by numerous punches and dies, working as gangs, so that a very large number of cavities is provided in a small space, and the cavities are all accurately of the size required to receive the cockle or other foreign matter, but to exclude the grain, which passes along and is delivered from the end of the cylinder, and the cockle, &c., is elevated by such cavities and delivered into a chute.

The pressed-up domes in the sheet metal have cavities that are especially adapted to seed-separators, because the surface of the sheet metal at the edges of the cavity is not a sharp angle, such as produced by punching or boring a hole in metal, but such edges are slightly rounding, and facilitate the reception of the seeds into the cavities and their discharge from the same, and can never become filled up and clogged as do the cylindrical cavities with sharp edges.

In the drawing, Figure 1 is a vertical section longitudinally of the cylinder. Fig. 2 is a cross-section; and Fig. 3 is a section in larger size of the cylinder at the ascending side.

The cylinder *a* is made of sheet metal, with the numerous indentations forming hemispherical cavities of a size adapted to receive the cockle or other foreign matter or seeds, and not large enough to receive the grain.

This cylinder is represented as sustained upon rollers *b b* in a frame-work, *c*.

At one end is an inward flange, *d*, and the grain is supplied at this end.

The tube or cylinder *e* is sustained at its ends by the journals that run in the links *h*, and these are at an inclination so as to sustain the tube *e* in the proper position inside of the cylinder *a*, and receive motion from the same.

The grain is fed in at one end of this tube *e*, and said tube is perforated to allow the grain to fall into cylinder *a*, but any large coarse substances or grain pass along such tube, and are delivered at the end, while cockle and small grain pass through the holes and is separated one from the other by the cylinder *a*.

The cockle and other foreign substances that will pass into the recesses in the cylinder *a* are elevated in such recesses and discharged into the chute or trough *l*, and this trough is held up by any suitable device, such as the bar *m*.

I claim as my invention—

1. The seed-separator made of a single thickness of sheet metal, with numerous pressed-up domes, forming hemispherical cavities, for the purposes and as set forth.

2. The tube *e*, sustained by the links *h*, in combination with the revolving cylinder *a*, as and for the purposes set forth.

Signed by me this 15th day of October, 1875.

FRANK C. MILLER.

Witnesses:
C. H. BLISS,
T. H. McCONNELL.